United States Patent [19]

Goldman et al.

[11] Patent Number: 4,693,817
[45] Date of Patent: Sep. 15, 1987

[54] GRAVEL TRAP AND COLLAR ASSEMBLY FOR AN UNDERGRAVEL AQUARIUM FILTER SYSTEM

[75] Inventors: Jerome Goldman, New York; Marvin Goldman, Great Neck; Gerald Phillips, Glen Cove, all of N.Y.

[73] Assignee: Penn Plax Plastics Inc., Garden City, N.Y.

[21] Appl. No.: 743,332

[22] Filed: Jun. 10, 1985

[51] Int. Cl.4 .............................................. E04H 3/16
[52] U.S. Cl. ................................. 210/169; 210/416.1; 210/461; 210/497.01
[58] Field of Search ...................... 210/461, 416.1, 169, 210/163, 166, 497.01; 55/525

[56] References Cited

U.S. PATENT DOCUMENTS

| | | | |
|---|---|---|---|
| 1,862,134 | 6/1932 | Boosey | 210/163 |
| 3,106,724 | 11/1963 | Heckman et al. | 55/525 |
| 4,033,872 | 7/1977 | Mori | 210/168 |
| 4,269,616 | 5/1981 | Fitzke et al. | 55/525 |
| 4,285,812 | 8/1981 | Stoltz | 210/163 |
| 4,472,274 | 9/1984 | Williams | 210/163 |

Primary Examiner—Andrew H. Metz
Assistant Examiner—Sharon T. Cohen
Attorney, Agent, or Firm—R. Scott Goldman

[57] ABSTRACT

An assembly which is used with an undergravel aquarium filter in order to keep the passage between the bottom cavity under the filter and the uptake tube free from blockage due to gravel. The assembly is in the form of a collar which extends from the bottom plate of the undergravel filter at the point of insertion of the uptake tube. A ring, with a structure to prevent the passage of gravel through the central portion thereof is fitted within the collar. The ring may be removed from the collar to clear gravel out from the collar before insertion of the uptake tube.

16 Claims, 5 Drawing Figures

GRAVEL TRAP AND COLLAR ASSEMBLY FOR AN UNDERGRAVEL AQUARIUM FILTER SYSTEM

BACKGROUND OF THE INVENTION

The present invention relates generally to a collar and a gravel trap assembly for an undergravel aquarium filter system and an improved undergravel filtration system for aquarium fish tanks. More particularly, the invention relates to an aquarium undergravel filtration system which has been adapted so as to prevent gravel from falling into and blocking the openings on the bottom plate of the filter system into which the uptake tubes of the filter system are placed. This adaptation involves the inclusion of a gravel trap in each opening for the uptake tubes in the bottom plate of the filter system.

Undergravel filter systems are often used in aquarium fish tanks in order to clean and purify the aquarium water by eliminating and neutralizing fish wastes, leftover food material, and other debris in the aquarium. The conventional undergravel filter system is formed by one or more bottom plates which are positioned at the bottom of a fish tank under a covering layer of the bottom material of the fish tank. The bottom material is usually in the form of gravel or small pebble mixtures. The bottom plates are provided with a multiplicity of small holes or slits which are adapted to allow the passage of water and waste material into a cavity which is formed under the bottom plates and over the bottom surface of the fish tank.

In order to function properly the undergravel filter is provided with a means to produce a current in the water of the fish tank. This current draws the water and waste material into the cavity through the bottom material covering and through the holes or slits in the bottom plate. Conventionally, in order to produce this current the undergravel filter system is provided with uptake tubes or stems with a diameter of approximately 0.5 to 1.5 inches and usually a 1 inch diameter. These uptake tubes are fitted into suitable openings in the back portion of the bottom plate. The uptake tubes or stems, when placed in the bottom plate openings form a clear passage into the bottom cavity under the bottom plate. In order to produce the required water current, a bubbling device, such as an airstone or the open end of an air supply tube is place at the bottom of the uptake tubes or stems in the interior of the tube. The bubbling device is conventionally attached to an air supply source by air supply tubing which passes into the interior of the uptake tube. The bubbles produced by the bubbling device rise through the interior space of the tube and out of an opening at the top of the tube. As the bubbles rise water is drawn along with the bubbles up the tube from the interior cavity under the bottom plates. This in turn causes water and debris to enter the cavity under the bottom plate through the slits and openings formed for this purpose. Further, the bubbling created by the bubbling device provides necessary aeration for the aquarium. In order for the the under gravel filter system to function suitably it is necessary that there be a clear passage between the interior of the uptake tubes and the bottom cavity formed by the bottom plate. It is essential that this passage be maintained free and clear of any blockages.

Often, in the operation of an aquarium which utilizes an undergravel filter system, it is necessary to remove the uptake tubes from the openings in the bottom plate in which they are positioned. When the uptake tubes are removed the gravel bottom material of the fish tank often falls into the opening in the bottom plate and passes into the bottom cavity or clogs the passage way formed by the opening in the bottom plate into which the uptake tubes are placed. This is because the gravel material covering the bottom plate of the undergravel filter system is often at a level which is near or above the point at which the uptake tube is fitted into the opening in the bottom plate. This is often the case even when the opening into which the uptake tube is fitted is provided with a collar extending above the level of the surface of the bottom plate. Collars often do not extend upward beyond the conventional depth of the gravel material. When gravel material falls into the opening provided for the uptake tube it is extremely difficult to clear the passageway for the free flow of water from the bottom cavity into the interior of the uptake tube. This causes clogging in the passageway and significantly decreases the effectiveness of the undergravel filter system in respect to the cleaning the water in the fish tank.

SUMMARY OF THE INVENTION

It is the object of the present invention to provide an undergravel filter system for aquarium fish tanks which allows for ease in clearing gravel material from the opening into which the uptake tube is placed.

It is a further object of the present invention to provide a trap for the gravel material, which fits into the opening in the bottom plate provided for the uptake tube, and which may be removed from the opening taking with it any gravel which has fallen into the opening. The gravel trap of the present invention, additionally, must be capable of allowing the passage of water and bubbles therethrough, while not allowing the passage of gravel therethrough, in order to allow suitable functioning of the filter system.

The present invention is a gravel trap and collar assembly which is formed on the bottom plate of the undergravel aquarium filter at the point where the uptake tube is attached to the bottom plate. The collar of this assembly extends above the opening in the bottom plate which forms the passageway between the bottom cavity under the bottom plate and the uptake tube. The collar is adapted so as to allow the gravel trap to fit within the collar and not fall into the bottom cavity under the bottom plate. Further, the collar is adapted to allow the uptake tube of the aquarium filter to fit securely therein. The present invention provides for a quick and efficient means of clearing gravel out of the passageway for water flow between the interior of the uptake tube and the cavity below the bottom plate of the filter.

The gravel trap and the collar assembly of the present invention comprises a collar which is either continuously formed as a protrusion from the bottom plate, or which is attached to the bottom plate around the opening in the bottom plate provided for the passage of water into uptake tube. The collar is formed so that the interior diameter is sufficient to allow for the secure fit of the uptake tube therein. The outer diameter of the uptake tube is generally between 0.5 and 1.5 inches so, therefore, the inner diameter of the collar should be within this size range. The collar of the present invention is also provided with a protrusion on its interior wall surface at a point which is at the lower end of the collar near the opening into the bottom cavity. This protrusion, which may be an interior ring, is adapted so as to keep the gravel trap from falling below the point of the protrusion. The collar system is generally formed from the same material as the bottom plate of the aquarium filter and this is generally an opaque plastic material.

The gravel trap of the presently claimed collar and gravel trap assembly comprises a base ring which is of sufficient size to fit within the interior of the collar system, so that the outer surface of the base ring is in a substantially adjacent relationship with the inner surface wall of the collar. This adjacent relationship prevents gravel from falling between the base ring of the trap and the inner wall of the collar. Further, since the base ring is in an adjacent relationship with the interior wall surface of the collar, the base ring will not pass the above mentioned projection formed on the interior wall surface of the collar at the lower portion thereof. Therefore, the gravel trap is prevented from falling into the bottom cavity under the bottom plate of the aquarium filter.

The interior or central portion of the base ring of the gravel trap is provided with a means to prevent the passage of gravel therethrough while allowing the passage of water and air. Such a means may be a screen type material or a bar structure, the bars may be, for example, parallel, nearly parallel, cross hatched or concentric ring bars, formed on the interior of the ring. Whatever the structure, this means is adapted to cover the entire central portion of the base ring. The means for preventing the passage of gravel may be level with the surface of the base ring. Alternatively, the means for preventing the passage of gravel may project above the surface of the base ring in the form of a cylinder, cone, rectangular box shape or the like. These structures may be truncated at the top to form a top surface on the projection. If the top surface of this projection is a flat surface, this surface should also be provided with bars or screening type material to prevent the passage of gravel. Further, if the means for preventing the passage of gravel does project above the surface of the base ring it must be formed in a size so that it does not contact the surface of the walls of the interior of the collar. The arrangment must provide enough space between the surface of the interior wall of the collar and the surface of the projecting structure to allow for the uptake tube to fit into the collar. In other words, if it projects above the base ring of the gravel trap, the means for preventing the passage of gravel, should be of a size which will fit within the interior of the uptake tube.

The gravel trap may also be provided with a means to facilitate its removal from the interior of the collar. Such a means may be a projection from the base ring of sufficient length to extend above or near the top of the collar. Such a projection may be of any shape so long as it is of a size which will fit within the uptake tube and, which may be grasped by the fingers. A suitable means for removing the gravel trap may be an extension of a portion of a concentric ring within and attached to the base ring. This concentric ring may be cut in cross section. It is preferable if the projection extends beyond the level of the collar to facilitate removal of the gravel trap from the collar.

The gravel trap may be made of any material which will withstand prolonged exposure to aquarium water. It is preferable if this material is plastic. Generally, it will be formed from the same material which is used to make the bottom plate of the filter system.

BRIEF DESCRIPTION OF THE DRAWINGS

The above and other objects and advantages of the present invention will become readily apparent by reference to the following detailed description when considered in conjunction with the accompanying drawings wherein.

Like references refer to like parts throughout the several views of the drawings.

DETAIL DESCRIPTION OF THE PREFERRED EMBODIMENT

Figure 1:
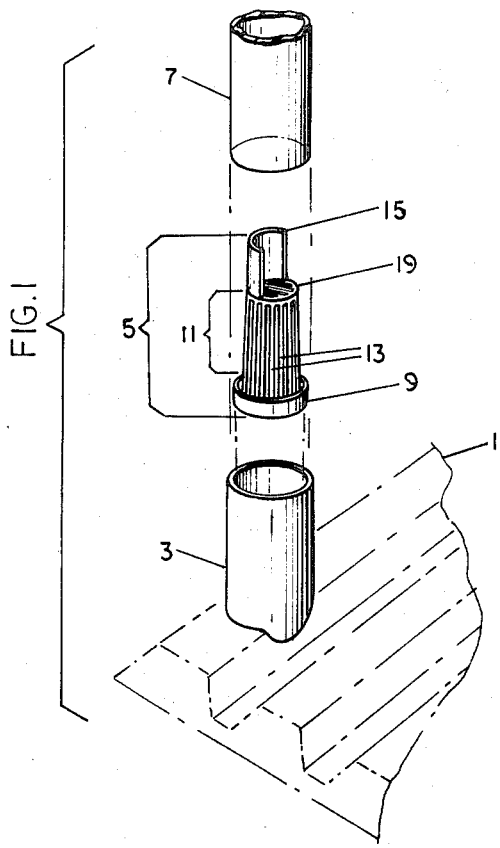
FIG. 1 is an exploded prospective view of the relevant parts of an undergravel filter system showing the preferred embodiment of the presently claimed collar and gravel trap assembly.

FIG. 1 shows an exploded, perspective view of the relevant portion of an under gravel filtration system, showing the preferred embodiment of the present invention. A portion of the bottom plate of the filter system is represented by numeral 1, and has projecting from the back thereof the collar 3 of the present invention. This collar 3 is adapted in size so as to allow the entry therein of the gravel trap 5 and the bottom portion of the uptake tube 7. The base ring 9 of the gravel trap 5 is adapted so as to fit within the interior space of the collar 3 so that the outer surface of the ring is adjacent to the inner wall surface of the collar. The means for preventing the passage of gravel 11 is adapted into the shape of a truncated cone, and is formed from a series of bars 13 which prevent the passage of gravel but allow water and air to flow therethrough. The means to facilitate the removal of the gravel trap 15 projects from the top portion of the truncated cone structure of the means to prevent passage of gravel. It consists of a sectional portion of an extension of the outer surface of the means to prevent the passage of gravel 11.

Figure 3:
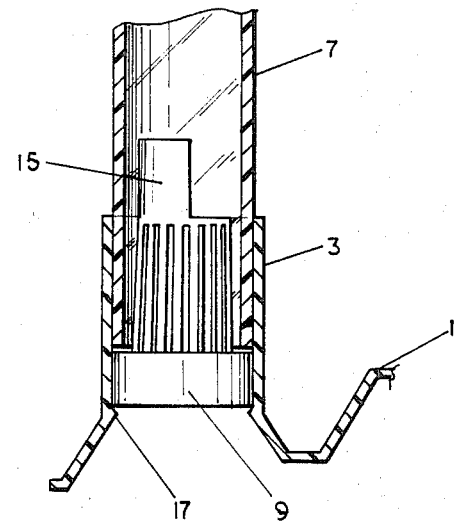
FIG. 3 is a cut away view of the collar and uptake tube showing the position of the gravel trap when the uptake tube is in place. This view also shows a cross section of a portion of the bottom plate.

As seen in FIG. 3, there is a projection 17 formed, at the lower portion, on the inner surface of the collar near the opening in the bottom plate. This figure shows the placement of the gravel trap and uptake tube in the collar assembly. It also illustrates the relation of these parts to the bottom plate itself and the bottom cavity thereunder.

Figure 4:
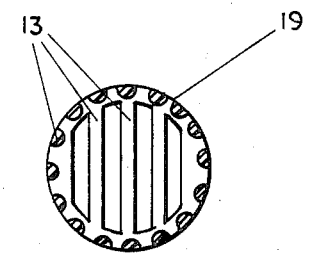
FIG. 4 is a cross sectional view of the preferred embodiment of the gravel trap of the present invention. The view is in the upward direction showing the interior portion of the upper surface of the preferred means to prevent the passage of gravel.
Figure 2:
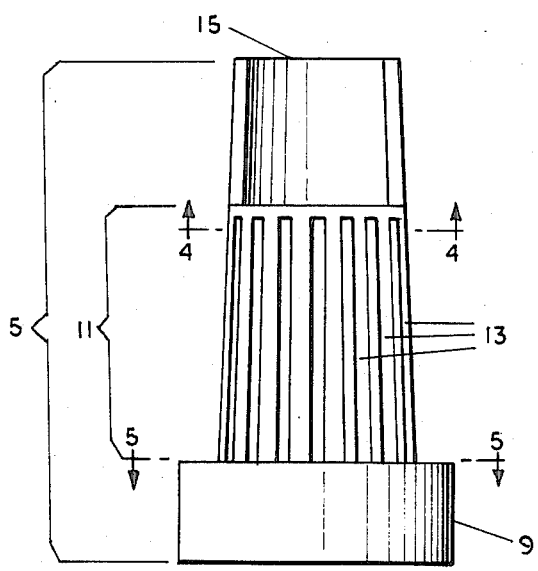
FIG. 2 is a front view of the preferred embodiment of the presently claimed gravel trap.

FIG. 4 shows the top surface portion of the truncated cone 19 which is the means to prevent the passage of gravel. This top surface portion 19 also is formed from a series of bar structures which do not allow the passage of gravel but do allow the passage of air and water.

Figure 5:
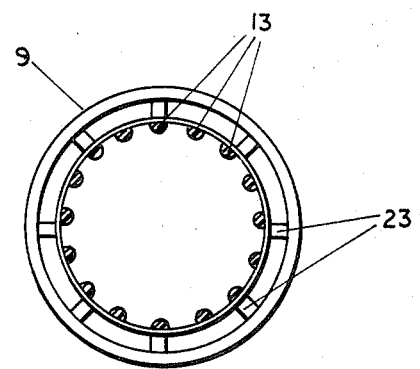
FIG. 5 is a cross sectional view of the preferred embodiment of the gravel trap of the present invention at a point at the top of the base ring where the means to prevent the passage of gravel initially projects from the base ring. The view is in the downward direction.

FIG. 5, shows the base ring 9 of the gravel trap 5 and the manner in which it is connected to the means to prevent the passage of gravel 11. This attachment consists of a series of bar shaped structures extending from the outer surface of the bottom portion of the means to prevent the passage of gravel to the inner surface of the base ring 9. These structures are designated as numeral 23.

It is readily apparent that the above described collar and gravel trap assembly for an undergravel aquarium filter system meets all the objectives mentioned as well as providing other advantages for use with an undergravel aquarium filter system. It should be understood that the specific form of the invention here and above described is intended to be representative only, as certain modifications within the scope of these teachings will be apparent to those skilled in the art of aquarium filter systems.

Accordingly, reference should be made to the following claims in determining the full scope of the invention.

What is claimed:

1. A gravel trap and collar assembly for an undergravel aquarium filter which comprises;
    a collar, projecting from the top surface of a bottom plate of the undergravel filter, the collar being positioned over means defining an opening in the bottom plate which forms means defining a passageway through the bottom plate into a bottom cavity under the bottom plate;
    a gravel trap, removeably fitted into the collar, the gravel trap having a base ring, fitting within the collar so that an interior wall surface of the collar and the outer surface of the base ring are substantially adjacent to each other, the gravel trap further having, attached to the base ring, and covering the entire central portion of the base ring, a means for preventing the passage of gravel therethrough, while allowing water and bubbles air to pass therethrough; and
    the gravel trap and collar assembly further having a means for preventing the gravel trap from falling into the bottom cavity through the opening in the bottom plate.

2. The gravel trap and collar assembly of claim 1, wherein the means for preventing the gravel trap from falling into the bottom cavity comprises; a protrusion projecting inwardly from an interior wall surface of the collar, the protrusion positioned at a point at the lower end of the collar, near the opening in the bottom plate.

3. The gravel trap and collar assembly of claim 1, further comprising, a projection, from the gravel trap, extending in an upward direction in a sufficient length to protrude out from the collar when the gravel trap is fitted in place in the collar.

4. The gravel trap and collar assembly of claim 1, wherein the means for preventing the passage of gravel therethrough is a series of bar structures.

5. The gravel trap and collar assembly of claim 1, wherein the collar has an inner diameter ranging between 0.5 and 1.5 inches.

6. The gravel trap and collar assembly of claim 5, wherein the collar extends above the upper surface of the bottom plate from 0.5 to 3 inches.

7. The gravel trap and collar assembly of claim 1, wherein the means for preventing the passage of gravel is a structure which projects above the surface of the base ring of the gravel trap.

8. The gravel trap and collar assembly of claim 7 wherein the means for preventing the passage of gravel is a structure which projects upward, from the base ring, in the form of a truncated cone, with a top surface thereon.

9. The gravel trap and collar assembly of claim 8, further comprising, a projection, from the gravel trap, extending in an upward direction in a sufficient length to protrude out from the collar when the gravel trap is fitted in place in the collar.

10. The gravel trap and collar assembly of claim 2, wherein the protrusion on the interior wall surface of the collar is an interior ring, encircling the entire circumference of the interior of the collar.

11. The gravel trap and collar assembly of claim 9, wherein the means for preventing the passage of gravel therethrough is a series of bar structures.

12. The gravel trap and collar assembly of claim 9, wherein the collar has an inner diameter ranging between 0.5 and 1.5 inches.

13. The gravel trap and collar assembly of claim 11, wherein the collar has an inner diameter ranging between 0.5 and 1.5 inches.

14. The gravel trap and collar assembly of claim 9, wherein the means for preventing the gravel trap from falling into the bottom cavity comprises; a protrusion projecting inwardly from an interior wall surface of the collar, the protrusion positioned at a point at the lower end of the collar, near the opening in the bottom plate.

15. The gravel trap and collar assembly of claim 13, wherein the means for preventing the gravel trap from falling into the bottom cavity comprises; a protrusion projecting inwardly from an interior wall surface of the collar, the protrusion positioned at a point at the lower end of the collar, near the opening in the bottom plate.

16. In an undergravel aquarium filter wherein a bottom plate is positioned in a fish tank over the bottom surface, and covered by a layer of gravel material, and wherein uptake tubes are positioned in an opening in the bottom plate so that the opening forms a passageway between the uptake tubes and a bottom cavity under the bottom plate, the improvement comprising;
    the undergravel filter being provided with a collar, projecting from the bottom plate, in an upward direction, and positioned directly over the opening in the bottom plate, and a gravel trap, removeably fitted into the collar, the gravel trap having a base ring, the outer surface of which is substantially adjacent to an inner wall surface of the collar, and a means for preventing the entry of the gravel material into and through the central portion of the base ring.

* * * * *